United States Patent
Ha et al.

(10) Patent No.: US 8,643,587 B2
(45) Date of Patent: Feb. 4, 2014

(54) FIELD SEQUENTIAL COLOR MODE LIQUID CRYSTAL DISPLAY

(75) Inventors: Chang Woo Ha, Kyungki-do (KR); Byoung Own Min, Kyungki-do (KR); Jeong In Cheon, Seoul (KR); Yu Jin Jang, Kyungki-do (KR)

(73) Assignee: Samsung Electronics Co., Ltd., Seoul (KR)

( * ) Notice: Subject to any disclaimer, the term of this patent is extended or adjusted under 35 U.S.C. 154(b) by 1571 days.

(21) Appl. No.: 11/566,505

(22) Filed: Dec. 4, 2006

(65) Prior Publication Data
US 2007/0182699 A1   Aug. 9, 2007

(30) Foreign Application Priority Data
Feb. 9, 2006   (KR) .................. 10-2006-0012692

(51) Int. Cl.
*G09G 3/36*   (2006.01)
(52) U.S. Cl.
USPC ............................................. 345/102; 345/87
(58) Field of Classification Search
USPC .................... 345/87–104, 39–46, 82–83
See application file for complete search history.

(56) References Cited

U.S. PATENT DOCUMENTS

| | | | | |
|---|---|---|---|---|
| 4,611,335 | A * | 9/1986 | Arai et al. ...................... | 375/360 |
| 5,337,068 | A * | 8/1994 | Stewart et al. .................. | 345/88 |
| 6,115,016 | A | 9/2000 | Yoshihara et al. | |
| 6,239,780 | B1 * | 5/2001 | Walker et al. .................. | 345/102 |
| 6,317,138 | B1 * | 11/2001 | Yano et al. ..................... | 345/589 |
| 6,400,101 | B1 * | 6/2002 | Biebl et al. .................... | 315/291 |
| 6,535,196 | B2 * | 3/2003 | Walker et al. ................. | 345/102 |
| 6,834,094 | B1 * | 12/2004 | Liu et al. ........................ | 377/47 |
| 6,864,643 | B2 | 3/2005 | Min et al. | |
| 6,867,757 | B1 * | 3/2005 | Nakamura ...................... | 345/83 |
| 7,317,403 | B2 * | 1/2008 | Grootes et al. ............ | 340/815.45 |
| 2001/0026261 | A1 * | 10/2001 | Walker et al. ................... | 345/98 |

(Continued)

FOREIGN PATENT DOCUMENTS

| | | |
|---|---|---|
| JP | 06084491 U | 12/1994 |
| JP | 2000-214825 A | 8/2000 |
| JP | 2000214825 A | 8/2000 |
| JP | 2005266117 A | 9/2005 |

OTHER PUBLICATIONS

Korean Intellectual Property Office, Office Action mailed Apr. 4, 2007 and English Translation.
German Patent Office, Office Action.

(Continued)

*Primary Examiner* — Alexander Eisen
*Assistant Examiner* — Nelson Lam
(74) *Attorney, Agent, or Firm* — Lowe Hauptman & Ham, LLP

(57) ABSTRACT

In an FSC mode LCD, a controller operates in response to an external adjustment, and a DC/DC converter converts a battery voltage into a driving voltage under control of the controller. A color LED backlight includes first, second and third color LED arrays connected in parallel, which are operated by the driving voltage. An FSC generator generates first, second and third color PWM signals according to an internal sawtooth voltage and a dimming voltage. A 3-channel current source generates first, second and third driving currents under control of the controller, and on/off switches paths of the first, second and third driving currents flowing through the first, second and third color LED arrays according to the first, second and third color PWM signals generated from the FSC generator, thereby adjusting luminance of the first, second and third color LED arrays of the color LED backlight.

11 Claims, 6 Drawing Sheets

(56) References Cited

U.S. PATENT DOCUMENTS

| | | | |
|---|---|---|---|
| 2002/0149576 A1* | 10/2002 | Tanaka et al. | 345/204 |
| 2005/0116922 A1* | 6/2005 | Kim | 345/102 |
| 2005/0190142 A1* | 9/2005 | Ferguson | 345/102 |
| 2005/0275643 A1* | 12/2005 | Richards | 345/204 |
| 2006/0022616 A1* | 2/2006 | Furukawa et al. | 315/309 |
| 2006/0139299 A1* | 6/2006 | Tsuchiya | 345/102 |
| 2007/0080911 A1* | 4/2007 | Liu et al. | 345/82 |

OTHER PUBLICATIONS

Office Action for Japanese patent application No. 2006-323282, mailed Mar. 30, 2010.

German Patent Office, Office Action mailed Oct. 8, 2009.

* cited by examiner

FIELD SEQUENTIAL COLOR MODE LIQUID CRYSTAL DISPLAY

RELATED APPLICATION

The present application is based on, and claims priority from, Korean Application Number 2006-12692, filed Feb. 9, 2006, the disclosure of which is hereby incorporated by reference herein in its entirety.

BACKGROUND OF THE INVENTION

1. Field of the Invention

The present invention relates to a field sequential color (FSC) mode liquid crystal display (LCD), and more particularly, to an FSC mode LCD in which a burst mode PWM dimming is applied to a field sequential driving scheme, thereby providing an improved luminance efficiency, a reduced color distortion, and high color reproduction and resolution, and reducing power consumption.

2. Description of the Related Art

As a cathode ray tube (CRT) become larger for a large display region, it becomes bulky and heavy. Thus, the CRT occupies a large insulation area and is difficult to carry. Due to these drawbacks, the CRT is not suitable for wall-mount TVs, whose demand is expected to increase rapidly, or monitors of portable computers.

Meanwhile, slim and light flat panel displays have been developed in order to replace the CRT. Examples of the flat panel displays include a liquid crystal display (LCD) and a plasma display panel (PDP).

Generally, the LCD includes an LCD back panel and a backlight unit. A cold cathode fluorescent lamp (CCFL) is widely used as a lamp of the backlight unit. The backlight unit is getting small-sized, slim, and lightweight. To meet this trend, light emitting diode (LED) has been proposed. The LED is advantageous over the CRT in terms of power consumption, weight, and luminance.

The LED backlight unit includes a white LED and a light guide plate for guiding light generated from the white LED. Also, the LCD back panel includes a plurality of liquid crystal cells arranged in a matrix form, a plurality of control switches (e.g., R, G and B switching transistors) for switching video signals to be applied to the liquid crystal cells, and R, G and B color filters formed on the liquid crystal cells. At this point, brightness (luminance) is adjusted using base signals of the R, G and B switching transistors, and color is adjusted using a combination of drain signals of the R, G and B switching transistors. Specifically, alignment direction of the liquid crystal cells is adjusted by the base signals and transmittance of light generated from the LED backlight unit is adjusted so that the brightness (luminance) is adjusted.

FIG. 1 is a block diagram of a conventional burst mode LCD.

Referring to FIG. 1, the conventional burst mode LCD includes a white LED backlight unit driver 10 and a white LED backlight unit 20.

The white LED backlight unit driver 10 includes a controller 11, a DC/DC converter 12, a burst mode dimmer 13, and a current source 14. The controller 11 controls a driving of the backlight unit in response to an external adjustment, and the DC/DC converter 12 converts a battery voltage (e.g., 2.8 V) into a driving voltage (e.g., 8 V) under control of the controller 11. The burst mode dimmer 13 generates a pulse width modulation (PWM) signal Spwm for adjusting the brightness according to an internal sawtooth voltage Vsaw and the dimming voltage Vdim. The current source 14 generates the driving current under control of the controller 11. A current flow of the current source 14 is turned on/off by the PWM signal outputted from the burst mode dimmer 13.

The white LED backlight unit 20 includes an LED array with a plurality of white LEDs.

FIG. 2 is a waveform diagram of main signals of the burst mode dimmer illustrated in FIG. 1.

Referring to FIG. 2, the sawtooth voltage Vsaw is compared with the dimming voltage Vdim. During a period in which the dimming voltage Vdim is lower than the sawtooth voltage Vsaw, the PWM signal Spwm maintains a high level. On the other hand, during a period in which the dimming voltage Vdim is higher than the sawtooth voltage Vsaw, the PWM signal Spwm maintains a low level.

By adjusting the dimming voltage Vdim, the duty of the PWM signal Spwm can be adjusted. By adjusting the duty ratio of the PWM signal Spwm, the turn-on time of a current flowing through the white LED backlight unit 20 can be adjusted. Consequently, the luminous intensity of the white LED backlight unit 20 can be adjusted.

The conventional burst mode LCD has a problem in that a field sequential driving is impossible because the LCD is implemented for a white LED driving scheme.

In addition, because the conventional burst mode LCD must use R, G and B color filters, its structure is complex and its resolution is lowered. Furthermore, because the conventional burst mode LCD uses the white LEDs, its color reproduction is degraded compared with the LCD using the color LED.

Moreover, the conventional LCD has a problem that causes luminance reduction and color distortion due to the color filters.

SUMMARY OF THE INVENTION

Accordingly, the present invention is directed to an FSC mode LCD that substantially obviates one or more problems due to limitations and disadvantages of the related art.

An object of the present invention is to provide an FSC mode LCD in which a burst mode PWM dimming is applied to a field sequential driving scheme, thereby providing an improved luminance efficiency, a reduced color distortion, and high color reproduction and resolution, and reducing power consumption.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an FSC mode LCD, including: a controller operating in response to an external adjustment; a DC/DC converter for converting a battery voltage into a driving voltage under control of the controller; a color light emitting diode (LED) backlight including first, second and third color LED arrays connected in parallel and operating by the driving voltage outputted from the DC/DC converter; an FSC generator for generating first, second and third color PWM signals, which are field sequential signals, according to an internal sawtooth voltage and a dimming voltage; and a 3-channel current source for generating first, second and third driving currents under control of the controller, and on/off switching paths of the first, second and third driving currents flowing through the first, second and third color LED arrays of the color LED backlight according to the first, second and third color PWM signals generated from the FSC generator, thereby adjusting luminance of the first, second and third color LED arrays of the color LED backlight.

The first, second and third color PWM signals may be sequential signals with the same width.

The FSC generator may include: a sawtooth voltage generating unit for generating a sawtooth voltage; a comparing unit for comparing the sawtooth voltage with an external dimming voltage to output a PWM signal; and an FSC logic unit for dividing the PWM signal by two and four, and operating a logic operation on the divided signals to generate the first, second and third color PWM signals.

The FSC logic unit may include: a first binary counter for dividing an output signal of the comparing unit by two to generate a first divided signal; a second binary counter for dividing an output signal of the first binary counter by two to generate a second divided signal; an inverter unit for inverting the first divided signal and the second divided signal to output a first inverted signal and a second inverted signal; a first AND gate unit for ANDing the first and second inverted signals to output a first logic signal, ANDing the first divided signal and the second inverted signal to output a second logic signal, ANDing the first inverted signal and the second divided signal to output a third logic signal, and ANDing the first and second divided signals to output a fourth logic signal; and a second AND gate unit for ANDing the first logic signal and the PWM signal to output a first color PWM signal, ANDing the second logic signal and the PWM signal to output a second color PWM signal, ANDing the third logic signal and the PWM signal to output a third color PWM signal, and ANDing the fourth logic signal and the PWM signal to output the second color PWM signal SP2.

The FSC logic unit may further include an OR gate unit for ORing the second color PWM signal given by ANDing the second logic signal and the PWM signal and the second color PWM signal given by ANDing the fourth logic signal and the PWM signal.

The second color LED array may be provided with a plurality of green LEDs.

The FSC logic unit may sequentially supply the first color PWM signal, the second color PWM signal, the third color PWM signal, and the second color PWM signal at each period.

The first color LED array may be provided with a plurality of red LEDs, and the third color LED array may be provided with a plurality of blue LEDs.

The first color LED array may be provided with a plurality of blue LEDs, and the third color LED array is provided with a plurality of red LEDs.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
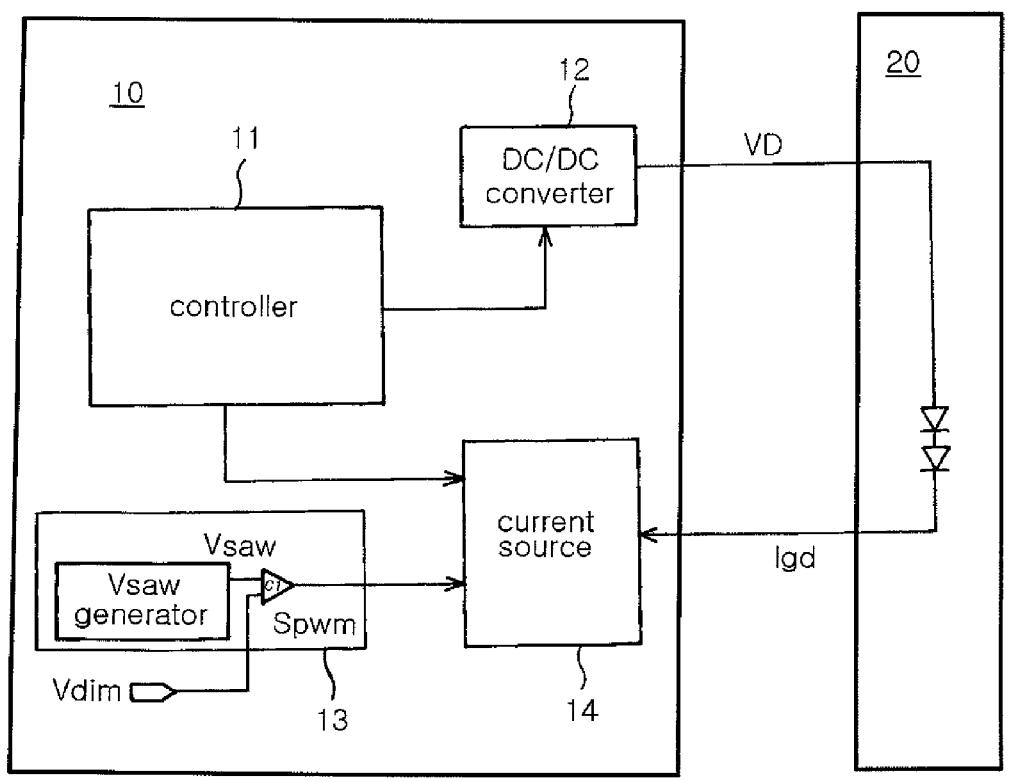
FIG. 1 is a block diagram of a conventional burst mode LCD.
Figure 2:
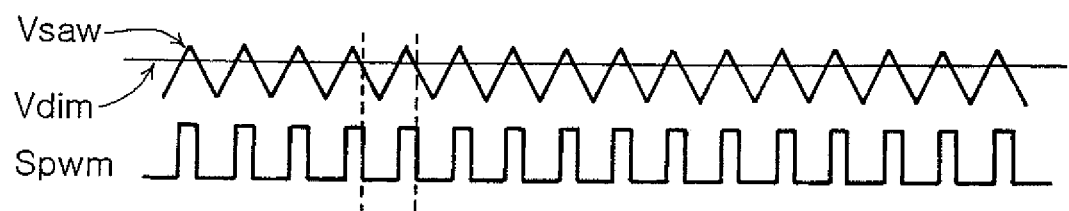
FIG. 2 is a waveform diagram of main signals of a burst mode dimmer illustrated in FIG. 1.

Reference will now be made in detail to the preferred embodiments of the present invention, examples of which are illustrated in the accompanying drawings. The same reference numerals are used to refer to the same elements throughout the drawings.

Figure 3:
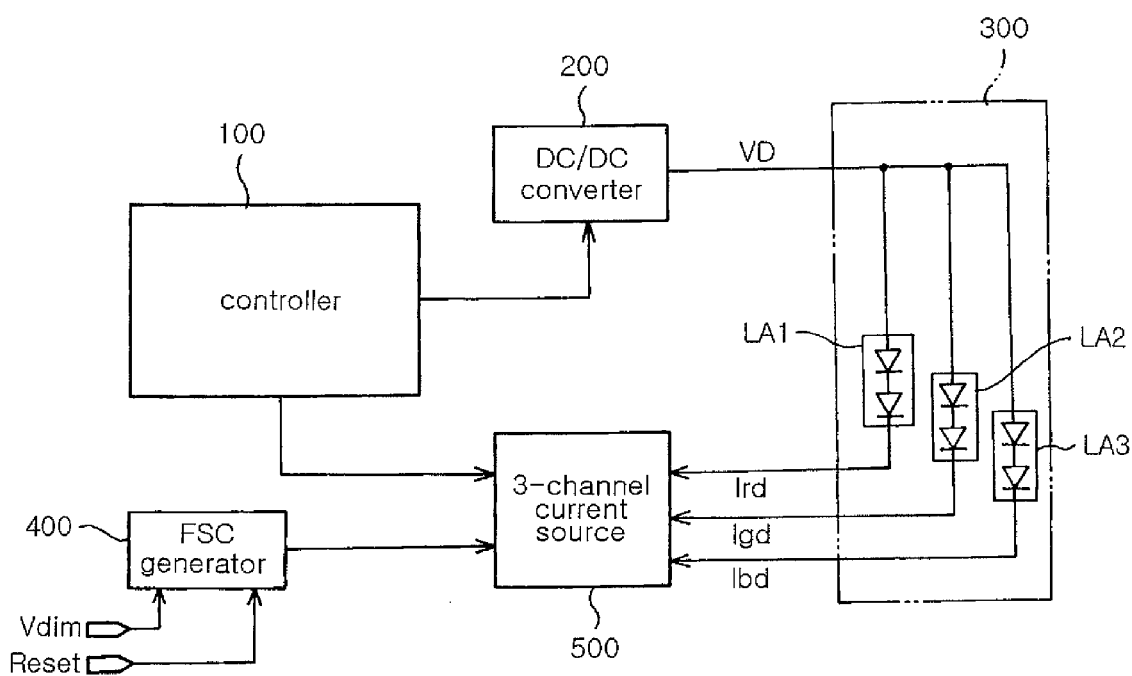
FIG. 3 is a block diagram of an FSC mode LCD according to an embodiment of the present invention.

FIG. 3 is a block diagram of an FSC mode LCD according to an embodiment of the present invention.

Referring to FIG. 3, the FSC mode LCD includes a controller 100, a DC/DC converter 200, a color LED backlight 300, an FSC generator 400, and a 3-channel current source 500.

The controller 100 controls the DC/DC converter 200, the 3-channel current source 500, and the color LED backlight 300 in response to an external.

The DC/DC converter 200 converts a battery voltage into a driving voltage VD suitable for driving the color LED backlight 300 under control of the controller 100.

The color LED backlight 300 includes first, second and third color LED arrays LA1, LA2 and LA3 connected in parallel. The first, second and third color LED arrays LA1, LA2 and LA3 are operated by the driving voltage VD outputted from the DC/DC converter 200.

The FSC generator 400 generates first, second and third filed-sequential color PWM signals SP1, SP2 and SP3 in response to an external sawtooth voltage Vsaw and a dimming voltage Vdim. The first, second and third color PWM signals SP1, SP2 and SP3 are signals that are sequentially generated and have the same width.

The 3-channel current source 500 generates first, second and third driving current Ird, Igd and Ibd under control of the controller 100. Also, the 3-channel current source 500 adjusts the luminance of the first, second and third color LED arrays LA1, LA2 and LA3 by on-off switching the paths of the first, second and third driving currents Ird, Igd and Ibd flowing through the first, second and third color LED arrays LA1, LA2 and LA3 of the color LED backlight 300 according to the first, second and third color PWM signals SP1, SP2 and SP3 generated from the FSC generator 400.

Figure 4:
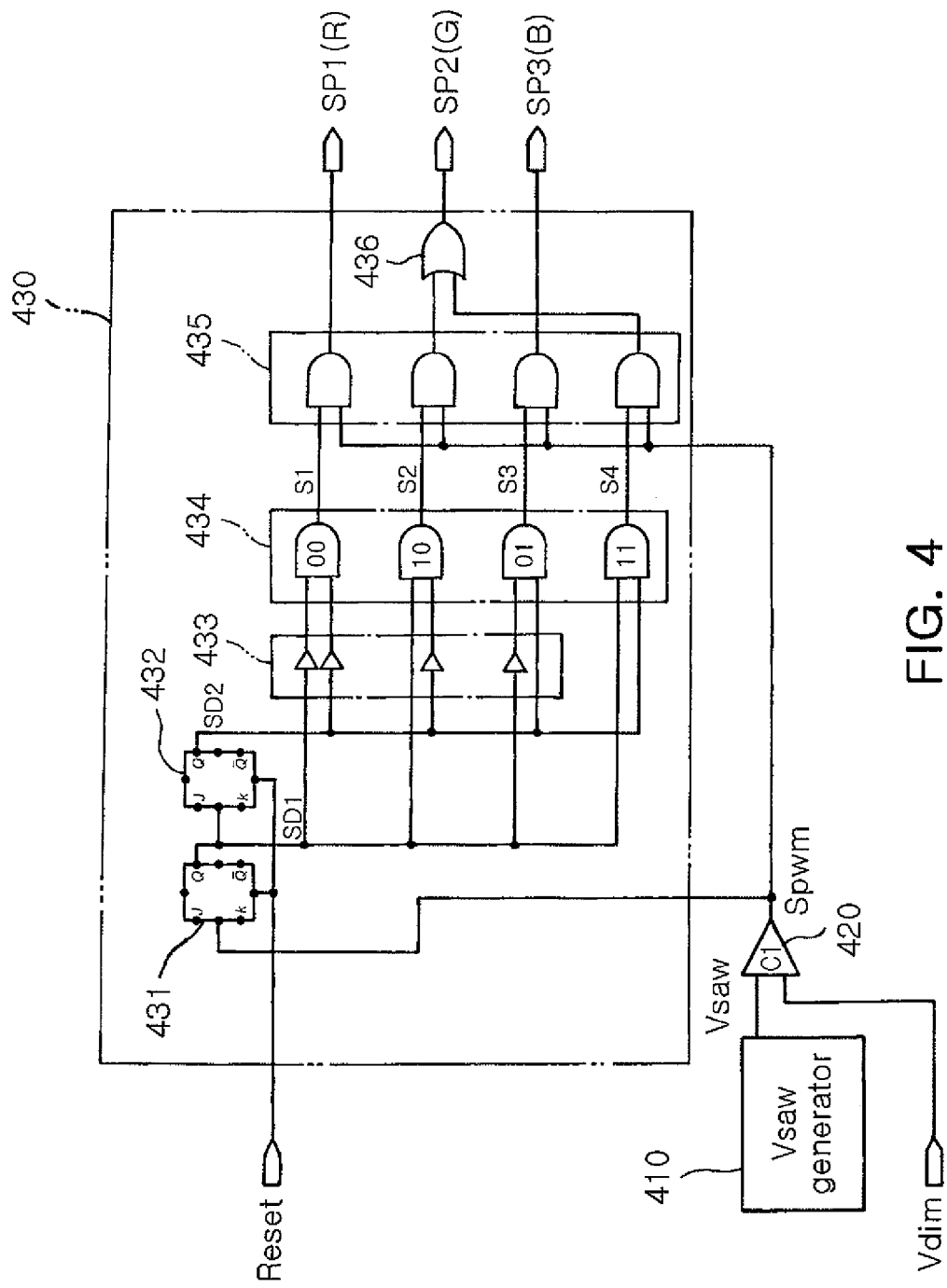
FIG. 4 is a circuit diagram of an FSC generator illustrated in FIG. 3.

FIG. 4 is a circuit diagram of the FSC generator illustrated in FIG. 3.

Referring to FIG. 4, the FSC generator 400 includes a sawtooth voltage generating unit 410, a comparing unit 420, and an FSC logic unit 430. The sawtooth voltage generating unit 410 generates a sawtooth voltage Vsaw, and the comparing unit 420 compares the sawtooth voltage Vsaw with an external dimming voltage Vdim to generate a PWM signal. The FSC logic unit 430 divides the PWM signal by two and four and performs a logic operation on the divided signals to generate the field sequential signals, that is, the first, second and third color PWM signals SP1, SP2 and SP3.

The FSC logic unit 430 includes a first binary counter 431 for dividing an output signal of the comparing unit 420 by two to generate a first divided signal SD1, a second binary counter 432 for dividing an output signal of the first binary counter 431 by two to generate a second divided signal SD2, an inverter unit 433 for inverting the first and second divided signals SD1 and SD2 to generate first and second inverted signals SI1 and SI2, a first AND gate unit 434 for generating first to fourth logic signals S1 to S4 using the first and second inverted signals SI1 and SI2, and a second AND gate unit 435 for generating the first, second and third color PWM signals SP1, SP2 and SP3 using the first to fourth logic signals S1 to S4 and the PWM signal Spwm.

The first AND gate unit 434 includes a first AND gate AND1 for ANDing the first and second inverted signals SI1 and SI2 to output the first logic signal S1, a second AND gate AND2 for ANDing the first divided signal SD1 and the second inverted signal SI2 to output the second logic signal S2, a third AND gate AND3 for ANDing the first inverted signal SI1 and the second divided signal SD2 to output the third logic signal S3, and a fourth AND gate AND4 for ANDing the first and second divided signals SD1 and SD2 to output the fourth logic signal S4.

The second AND gate unit 435 includes a fifth AND gate AND5 for ANDing the first logic signal S1 and the PWM signal Spwm to output the first color PWM signal SP1, a sixth AND gate AND6 for ANDing the second logic signal S2 and the PWM signal Spwm to output the second color PWM signal SP2, a seventh AND gate AND7 for ANDing the third logic signal S3 and the PWM signal Spwm to output the third color PWM signal SP3, and an eighth AND gate AND8 for ANDing the fourth logic signal S4 and the PWM signal Spwm to output the second color PWM signal SP2.

The FSC logic unit 430 further includes an OR gate unit 436 for ORing an output signal of the sixth AND gate AND6 and an output signal of the eighth AND gate AND8 to output the second color PWM signal SP2.

When the second color LED array LA2 is provided with a plurality of green LEDs, the FSC logic unit 430 can sequentially supply the first color PWM signal SP1, the second color PWM signal SP2, the third color PWM signal SP3, and the second color PWM signal SP2 at each period.

In addition, the first color LED array LA1 may be provided with a plurality of red LEDs, and the third color LED array LA3 may be provided with a plurality of blue LEDs.

Figure 5:
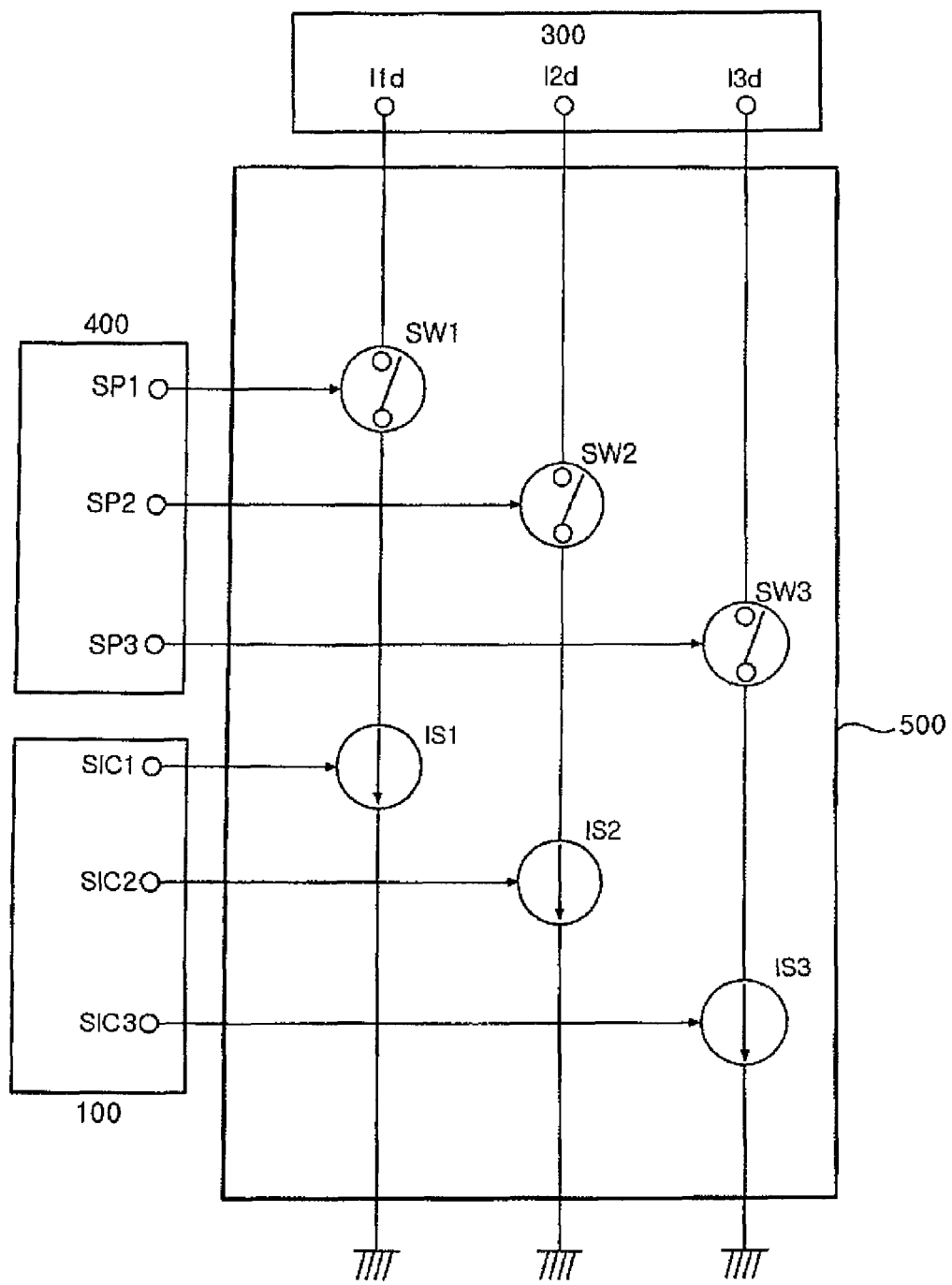
FIG. 5 is a circuit diagram of a 3-channel current source illustrated in FIG. 3.

FIG. 5 is a circuit diagram of the 3-channel current source illustrated in FIG. 3.

Referring to FIG. 3, the 3-channel current source 500 includes first, second and third current sources IS1, IS2 and IS3 and switches SW1, SW2 and SW3. The first, second and third current sources IS1, IS2 and IS3 are connected between the respective LED arrays of the color LED backlight 300 and ground and generates first, second and third driving currents Ird, Igd and Ibd according to the controls SIC1, SIC2 and SIC3 of the controller 100. The switches SW1, SW2 and SW3 are connected to current paths formed between the first, second and third current sources IS1, IS2 and IS3 and the color LED backlight 300, and are switched on/off in response to the first, second and third color PWM signals SP1, SP2 and SP3.

Figure 6:
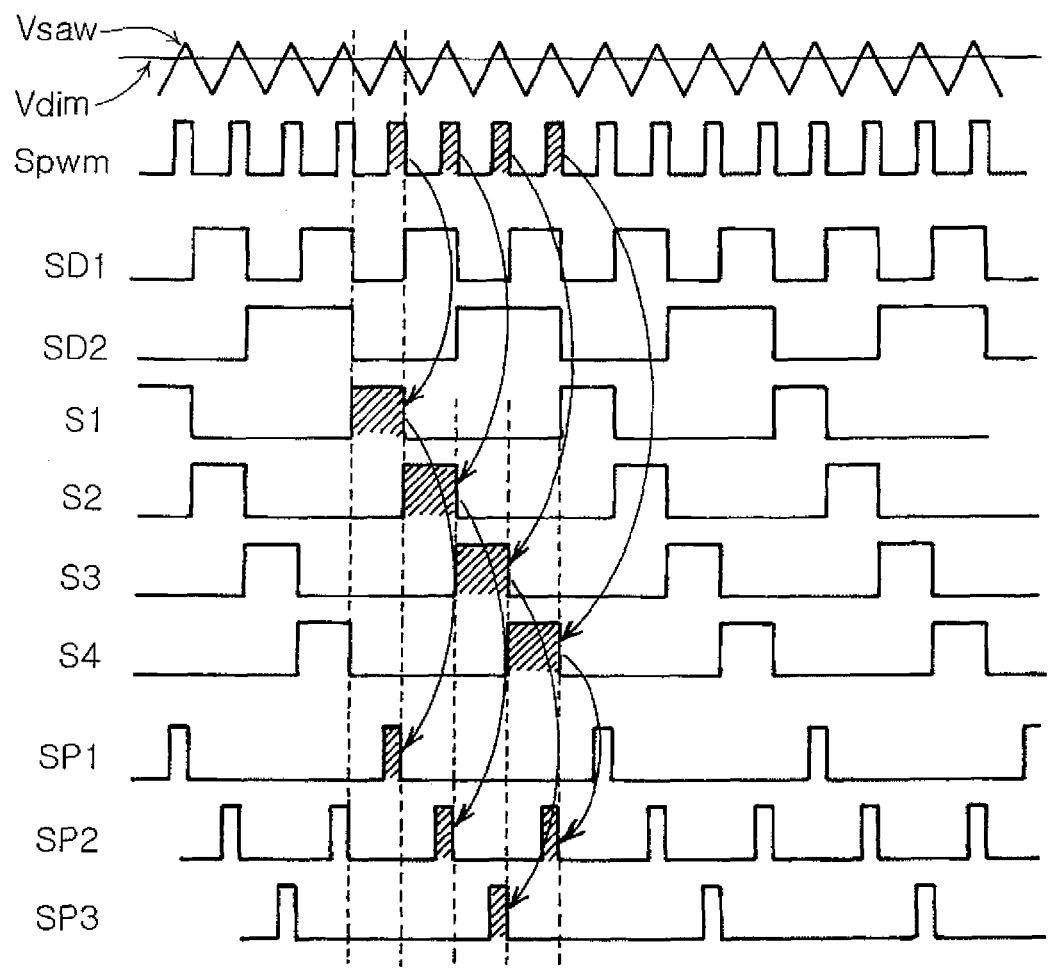
FIG. 6 is a waveform diagram of main signals of the FSC generator illustrated in FIG. 3.

FIG. 6 is a waveform diagram of main signals of the FSC generator illustrated in FIG. 3.

In FIG. 6, Vsaw is the sawtooth voltage generated from the sawtooth voltage generating unit 410, Vdim is the external dimming voltage for luminance adjustment, Spwm is the PWM signal outputted from the comparing unit 420, SD1 and SD2 are the first and second divided signals outputted from the first and second binary counters 431 and 432, S1 to S4 are the first to fourth logic signals outputted from the first AND gate unit 434, and SP1, SP2 and SP3 are the first, second and third color PWM signals outputted from the FSC logic unit 430.

Hereinafter, the operation and effect of the present invention will be described in detail with reference to the accompanying drawings.

An operation of the FSC mode LCD according to the present invention will now be described with reference to FIGS. 3 to 6.

Referring to FIG. 3, the controller 100 controls the driving voltage of the DC/DC converter 200 and the driving current of the 3-channel current source 500 in response to the user's external luminance adjustment.

The DC/DC converter 200 converts a low battery voltage of about 1.8 V into a high driving voltage VD of about 8 V suitable for driving the color LED backlight 300 under control of the controller 100, and supplies the high driving voltage VD to the color LED backlight 300.

The color LED backlight 300 is operated by the driving voltage VD supplied from the DC/DC converter 200. This operation will be described in more detail. The first, second and third color LED arrays LA1, LA2 and LA3 of the color LED backlight 300 are operated by the driving currents Ird, Igd and Ibd derived from the driving voltages VD generated from the DC/DC converter 200, respectively. That is, the first color LED array LA1 is operated by the driving current Ird, the second color LED array LA2 is operated by the driving current Igd, and the third color LED array LA3 is operated by the driving current Ibd.

During this operation, the currents flowing through the first, second and third color LED arrays LA1, LA2 and LA3 are controlled by the FSC generator 400. The FSC generator 400 generates the first, second and third color PWM signals SP1, SP2 and SP3 according to the sawtooth voltage Spwm and the dimming voltage Vdim, and outputs them to the 3-channel current source 500. Thus, the luminance of the first, second and third color LED arrays LA1, LA2 and LA3 is controlled by the 3-channel current source 500.

The first, second and third color PWM signals SP1, SP2 and SP3 are the sequential signals with the same width.

The 3-channel current source 500 includes the first, second and third current sources IS1, IS2 and IS3 connected to the ground to generate the first, second and third driving currents under control of the controller 100. The first, second and third driving currents correspond to the driving currents Ird, Igd and Ibd flowing through the first, second and third color LED arrays LA1, LA2 and LA3, respectively.

Referring to FIG. 5, the first color LED array LA1 of the color LED backlight 300 is connected to or disconnected from the first current source IS1 according to the first color PWM signal SP1 generated from the FSC generator 400. The second color LED array LA2 of the color LED backlight 300 is connected to or disconnected from the second current source IS2 according to the second color PWM signal SP2 generated from the FSC generator 400. Also, the third color LED array LA3 of the color LED backlight 300 is connected to or disconnected from the third current source IS3 according to the third color PWM signal SP3 generated from the FSC generator 400.

Therefore, the luminance of the first, second and third color LED arrays LA1, LA2 and LA3 is controlled by the first, second and third PWM signals SP1, SP2 and SP3.

The FSC generator 400 will now be described in more detail with reference to FIG. 4.

Referring to FIG. 4, the sawtooth voltage generating unit 410 of the FSC generator 400 generates the sawtooth voltage Vsaw having a preset frequency (see FIG. 6) to the comparing unit 420. The comparing unit 420 compares the sawtooth voltage Vsaw with the external dimming voltage Vdim to generate the PWM signal.

For example, when the sawtooth voltage Vsaw is higher than the dimming voltage Vdim, the comparing unit 420 generates the PWM signal of a high level. On the other hand, when the sawtooth voltage Vsaw is lower than the dimming voltage Vdim, the comparing unit 420 generates the PWM signal of a low level. The PWM signal having the high level and the low level is inputted to the FSC logic unit 430.

The FSC logic unit 430 divides the PWM signal Spwm by two and four and performs a logic operation on the divided signals to generate the field sequential signals, that is, the first, second and third color PWM signals SP1, SP2 and SP3 to the 3-channel current source 500.

In addition, the FSC logic unit 430 will now be described in more detail with reference to FIG. 4.

Referring to FIG. 4, the FSC logic unit 430 may include the first binary counter 431, the second binary counter 432, the inverter unit 433, the first AND gate unit 434, the second AND gate unit 435, and the OR gate unit 436.

As illustrated in FIG. 6, the first binary counter 431 divides the output signal of the comparing unit 420 by two to generate the first divided signal SD1, and the second binary counter 432 divides the output signal of the first binary counter 431 by two to generate the second divided signal SD2. Also, the inverter unit 433 inverts the first and second divided signals SD1 and SD2 to output the first and second inverted signals SI1 and SI2.

The first AND gate unit 434 outputs the first to fourth logic signals S1 to S4 using the first and second divided signals SD1 and SD2 and the first and second inverted signals SI1 and SI2. The second AND gate unit 435 outputs the first, second and third color PWM signals SP1, SP2 and SP3 using the first to fourth logic signals S1 to S4 and the PWM signal Spwm.

Meanwhile, when the second color LED array LA2 of the color LED backlight 300 is provided with a plurality of green LEDs, the first color LED array LA1 may be provided with a plurality of red LEDs and the third color LED array LA3 may be provided with a plurality of blue LEDs.

In this case, the first color PWM signal SP1 is used to control the luminance of the red LEDs, the second color PWM signal SP2 is used to control the luminance of the green LEDs, and the third color PWM signal SP3 is used to control the luminance of the blue LEDs.

On the other hand, when the second color LED array LA2 is provided with a plurality of green LEDs, the first color LED array LA1 may be provided with a plurality of blue LEDs and the third color LED array LA3 may be provided with a plurality of red LEDs.

An embodiment of the first AND gate unit 434 will be described below.

The first AND gate unit 434 may include a first AND AND1 for ANDing the first and second inverted signals SI1 and SI2 to output the first logic signal S1, a second AND gate AND2 for ANDing the first divided signal SD1 and the second inverted signal SI2 to output the second logic signal S2, a third AND gate AND3 for ANDing the first inverted signal SI1 and the second divided signal SD2 to output the third logic signal S3, and a fourth AND gate AND4 for ANDing the first and second divided signals SD1 and SD2 to output the fourth logic signal S4.

As illustrated in FIG. 6, the first, second, third and fourth logic signals S1, S2, S3 and S4 have high level in sequence without overlapping one another.

An embodiment of the second AND gate unit 435 will be described below.

The second AND gate unit 435 may include a fifth AND gate AND5 for ANDing the first logic signal S1 and the PWM signal Spwm to output the first color PWM signal SP1, a sixth AND gate AND6 for ANDing the second logic signal S2 and the PWM signal Spwm to output the second color PWM signal SP2, a seventh AND gate AND7 for ANDing the third logic signal S3 and the PWM signal Spwm to output the third color PWM signal SP3, and an eighth AND gate AND8 for ANDing the fourth logic signal S4 and the PWM signal Spwm to output the second color PWM signal SP2.

In addition, the FSC logic unit 430 further includes an OR gate unit 436 for ORing an output signal of the sixth AND gate AND6 and an output signal of the eighth AND gate AND8 to output the second color PWM signal SP2.

Referring to FIG. 6, the high levels of the first, second, third and fourth logic signals S1, S2, S3 and S4 are synchronized with sequential pulses of the PWM signals Spwm so that the first color PWM signal SP1, the second color PWM signal SP2, the third color PWM signal SP3, and the second color PWM signal SP4 have high levels in sequence within one period. Therefore, the first color PWM signal SP1, the second color PWM signal SP2, the third color PWM signal SP3, and the second color PWM signal SP4 become field sequence signals of the FSC mode.

As described above, when the second color PWM signal SP2 is a PWM signal of the green LED, the green LED is turned on two times during one period, while the other color LEDs are turned on one time. The reason for this is that the green LED is much degraded than the red LED or the blue LED in terms of color.

In the FSC driving scheme to sequentially turn on the red LED, the green LED, and the blue LED, the turn-on time of each color LED is made to have the same PWM width, and the turn-on time of the green LED is made to relatively increase the number of turn-on times of the green LED within one period, thereby improving the color reproduction.

As described above, the FSC generator applied to the FSC mode LCD can be implemented with a simple structure. Also, advantages of the FSC driving scheme and the burst mode driving scheme can be taken by their combination.

The FSC mode LCD according to the present invention can provide the improved luminance efficiency, the reduced color distortion, and the high color reproduction and resolution and can reduce the power consumption by applying the burst mode PWM dimming to the field sequential driving scheme.

That is, the field sequential can be implemented by generating red-green-blue-green sequential signals and the duty can be adjusted using the dimming signal, thus implementing the burst mode PWM dimming. The field sequential driving of the TFT LCD using the color LED backlight is possible by implementing the field sequential driving and the burst mode PWM dimming at the same time.

Because the color filters of the TFT LCD are removed, the luminance reduction and color distortion caused by the color filters can be removed. The pixel size can be reduced by ⅓ compared with the conventional TFT LCD. By individually using the R, G and B light sources, the color reproduction can be improved and the power consumption can be reduced by time-driving the R, G and B LEDs.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A field sequential color (FSC) mode liquid crystal display (LCD), comprising:
   a controller configured to operate in response to an external adjustment;
   a direct-current-to-direct-current (DC/DC) converter configured to convert a battery voltage into a driving voltage under control of the controller;
   a color light emitting diode (LED) backlight including first, second, and third color LED arrays connected in parallel and configured to be operated by the driving voltage outputted from the DC/DC converter;
   an FSC generator configured to generate first, second, and third color PWM signals as field sequential signals according to an internal sawtooth voltage and a dimming voltage; and
   a 3-channel current source configured to generate first, second, and third driving currents flowing through the first, second, and third color LED arrays of the color LED backlight, respectively, the 3-channel current source comprising respective on/off switching paths for the first, second, and third driving currents respectively controlled according to the first, second, and third color PWM signals generated from the FSC generator to adjust luminances of the first, second, and third color LED arrays of the color LED backlight, wherein
   the FSC generator comprises:
      a sawtooth voltage generating unit configured to generate the internal sawtooth voltage;
      a comparing unit configured to compare the sawtooth voltage with the dimming voltage to output a PWM signal; and
      an FSC logic unit configured to divide the PWM signal by two and four and operate a logic operation on the divided signals to generate the first, second, and third color PWM signals, and
   the FSC logic unit comprises:
      a first binary counter configured to divide an output signal of the comparing unit by two to generate a first divided signal;
      a second binary counter configured to divide an output signal of the first binary counter by two to generate a second divided signal;
      an inverter unit configured to invert the first divided signal and the second divided signal to output a first inverted signal and a second inverted signal;
      a first AND gate unit configured to perform a logical sum (AND) operation of the first and second inverted signals to output a first logic signal, an AND operation of the first divided signal and the second inverted signal to output a second logic signal, an AND operation of the first inverted signal and the second divided signal to output a third logic signal, and an AND operation of the first and second divided signals to output a fourth logic signal; and
      a second AND gate unit configured to perform a logical product (AND) operation of the first logic signal and the PWM signal to output a first color PWM signal, an AND operation of the second logic signal and the PWM signal to output a second color PWM signal, an AND operation of the third logic signal and the PWM signal to output a third color PWM signal, and an AND operation of the fourth logic signal and the PWM signal to output the second color PWM signal.

2. The FSC mode LCD of claim 1, wherein the FSC logic unit further comprises an OR gate unit configured to perform a logical sum (OR) operation of an output from the AND operation of the second logic signal and the PWM signal and an output from the AND operation of the fourth logic signal and the PWM signal, to output the second color PWM signal.

3. The FSC mode LCD of claim 1, wherein the second color LED array comprises a plurality of green LEDs.

4. The FSC mode LCD of claim 3, wherein the FSC logic unit is configured to sequentially supply a pulse by the first color PWM signal, a pulse by the second color PWM signal, a pulse by the third color PWM signal, and a pulse by the second color PWM signal at each period corresponding to four pulses of the PWM signal.

5. The FSC mode LCD of claim 4, wherein
   the first color LED array comprises a plurality of blue LEDs, and
   the third color LED array comprises a plurality of red LEDs, or vice versa.

6. The FSC mode LCD of claim 3, wherein
   the first color LED array comprises a plurality of red LEDs, and
   the third color LED array comprises a plurality of blue LEDs.

7. The FSC mode LCD of claim 3, wherein
   the first color LED array comprises a plurality of blue LEDs, and
   the third color LED array comprises a plurality of red LEDs.

8. The FSC mode LCD of claim 1, wherein the first, second, and third color PWM signals are sequential signals with the same width, and each has a high level in sequence without overlapping one another.

9. The FSC mode LCD of claim 1, further comprising:
   an LCD panel being free of color filters.

10. A color light emitting diode (LED) backlight module for a field sequential color (FSC) mode liquid crystal display (LCD), the color LED backlight module comprising:
   a direct-current-to-direct-current (DC/DC) converter electrically coupled to a controller and configured to convert a first voltage from a voltage source to a drive voltage;
   a color LED backlight array electrically coupled to the DC/DC converter, the color LED backlight array comprising:
      a red LED array comprising a plurality of red LEDs;
      a green LED array comprising a plurality of green LEDs; and
      a blue LED array comprising a plurality of blue LEDs;
   an FSC generator configured to generate a red PWM signal, a green PWM signal, and a blue PWM signal, the FSC generator comprising:
      a sawtooth voltage generating unit configured to generate a sawtooth voltage;
      a comparing unit configured to compare the sawtooth voltage with a dimming voltage to output a PWM signal; and
      an FSC logic unit configured to generate first to fourth logic signals each having a frequency of one-fourth of the frequency of the PWM signal, and to generate the red, green, and blue PWM signals; and
   a 3-channel current source electrically coupled to the color LED backlight array and the FSC generator, the 3-channel current source being configured to selectively provide current paths for the red LED array, the green LED array, and the blue LED array based on the red, green, and blue PWM signals, wherein
   the FSC logic unit comprises:
      a first binary counter configured to divide an output signal of the comparing unit by two to generate a first divided signal;

a second binary counter configured to divide an output signal of the first binary counter by two to generate a second divided signal;

an inverter unit configured to invert the first divided signal and the second divided signal to output a first inverted signal and a second inverted signal;

a first AND gate unit configured to perform a logical sum (AND) operation of the first and second inverted signals to output a first logic signal, an AND operation of the first divided signal and the second inverted signal to output a second logic signal, an AND operation of the first inverted signal and the second divided signal to output a third logic signal, and an AND operation of the first and second divided signals to output a fourth logic signal; and a second AND gate unit configured to perform a logical product (AND) operation of the first logic signal and the PWM signal to output a first color PWM signal, an AND operation of the second logic signal and the PWM signal to output a second color PWM signal, an AND operation of the third logic signal and the PWM signal to output a third color PWM signal, and an AND operation of the fourth logic signal and the PWM signal to output the second color PWM signal.

11. The color LED backlight module of claim 10, wherein the FSC logic unit is configured to sequentially supply a pulse by the red PWM signal, a pulse by the green PWM signal, a pulse by the blue PWM signal, and a pulse by the green PWM signal at each period corresponding to four pulses of the PWM signal.

* * * * *